C. McBurney,
Shoe-Sole Machine,
No 1,587, Reissued Dec. 8, 1863.
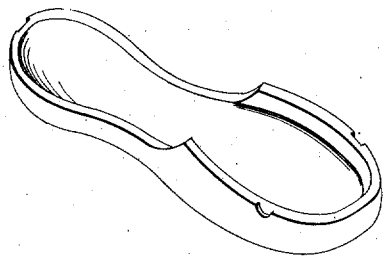
Fig. 3
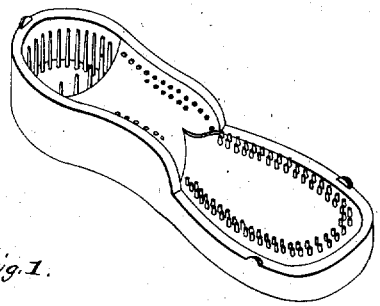
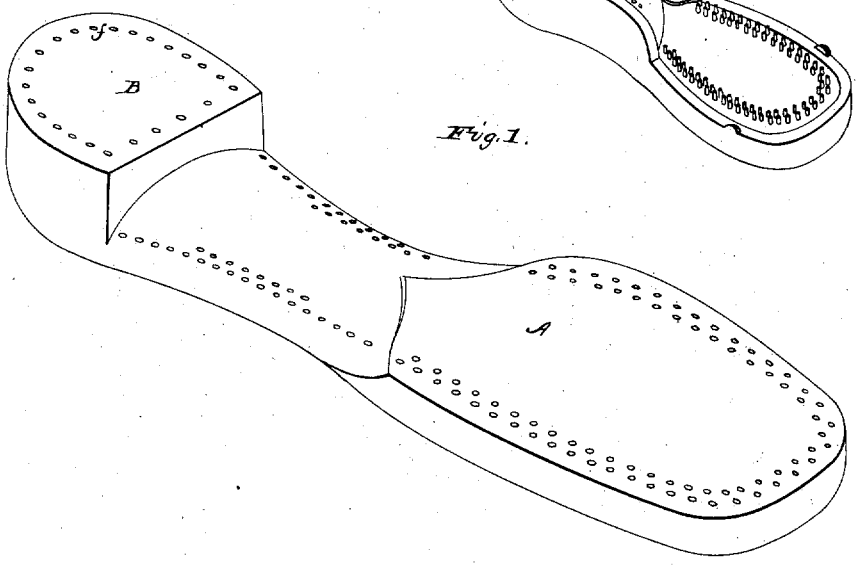
Fig. 1.
Fig. 2.
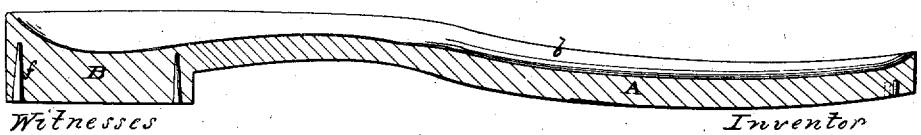
Witnesses
Thos. R. Roach
F. E. Teschemacher
Inventor
C. McBurney

UNITED STATES PATENT OFFICE.

CHARLES McBURNEY, OF ROXBURY, MASSACHUSETTS.

IMPROVEMENT IN INDIA-RUBBER SOLES FOR BOOTS AND SHOES.

on forming part of Letters Patent No. 1,587, dated April 5, 1869; Reissue No. 1,587, dated December 8, 1863.

DIVISION B.

*To all whom it may concern:*

Be it known that I, CHAS. McBURNEY, of Roxbury, in the county of Norfolk and State of Massachusetts, have invented a new and useful Sole for Boots and Shoes, of which the following is a full, clear, and exact description, reference being had to the accompanying drawings, making part of this specification, in which—

Figure 1 is a view of the sole seen from beneath; Fig. 2, a longitudinal section through the same; Fig. 3, a view of the two halves of the mold in which the sole is vulcanized.

My invention has for its object to make the soles of boots and shoes of india-rubber or other vulcanizable gums or the compounds thereof, these materials being particularly adapted to this purpose by their durability, elasticity, and imperviousness to water.

The attempt has before been made to form complete soles of india-rubber, which were secured to the boot or shoe by nails or pegs in a manner similar to that adopted for the purpose of securing the leather soles of ordinary pegged shoes. Such sole, however, when applied was liable to the serious objection that the holes made for the pegs caused the edges of the sole to bulge out opposite to each peg. This gave to the sole an unsightly appearance, which it was not found practicable subsequently to remove. Another difficulty attending the use of soles thus perforated subsequent to vulcanization is found in this, that the strength of the material is reduced just at the point where it should be the greatest, the strain upon the sole when in wear being at the surface of the pegs every motion of the foot, and also the distention caused by dirt which enter between the pegs and the sole tends to tear the rubber. The slightest cut or puncture, exposing a fresh surface of rubber, extends rapidly; but in my improved soles every part is equally strong and durable, the rubber along the whole surface, including the holes to receive the pegs, being of closer texture or condensed by contact with the mold during the process of heating or vulcanization, which, as is well known, produces a pellicle or thin stratum that is tougher than the inner portion of the material.

My present invention consists in the production as a new article of manufacture of a sole for boots or shoes made of vulcanized india-rubber or other vulcanizable gum provided with holes for the reception of nails, pegs, rivets, threads, or other mechanical devices by means of which the sole may be attached to the uppers, such holes having a protecting external vulcanized surface, substantially as hereinafter described; and my invention further consists in making india-rubber soles or soles of any other vulcanizable gum in molds, in combination with forming therein previous to vulcanization holes designed to contain nails, pegs, rivets, threads, or other mechanical means for the attachment of the sole to the uppers.

In the accompanying drawings the sole A and heel B are made of a single piece, and are manufactured ready to be applied to the boot. The upper surface, *b*, of the sole herein shown is formed to suit the shape of the foot, and this may be done much more perfectly than can be effected in leather. Both the sole and the heel are punctured through, or nearly through, with holes, *f*, for the pegs or nails. This is effected by pins *h*, attached to and making part of the mold, Fig. 3, in which the sole is vulcanized; and when it is to be applied to the shoe it is simply necessary to insert the pegs or nails into the holes *f* and drive them, the nails being slightly larger than the holes, that there may be sufficient adhesion between them and the india-rubber to hold the sole in place. I thus accomplish several very desirable ends: First, the workman is relieved of the labor of making the holes *f* for the pegs, and the time required for this operation is saved; secondly, the edge of the sole is not disfigured by the bulging of the material opposite to each hole, as is the case where the sole is vulcanized solid and the holes are subsequently punched; thirdly, the tearing or disintegration of the sole at or about the holes is prevented.

Either wooden pegs or metallic nails may be employed to secure the sole to the shoe, or the holes may be of a suitable size and depth to allow the sole to be attached by sewing.

The holes may be made slightly conical in conformity with the shape of nails or pegs generally used. In some cases, particularly for thick soles, I prefer to close the holes at the top of the sole by means of a sheet incorporated with the sole of such thinness or by making the holes of such depth as that the introduction of the peg or nail shall have no effect on the shape of the sole and prevent exposure of any cut or torn portion thereof.

In the manufacture of the above sole I prefer the following composition of materials: Four to eight pounds india-rubber, one to four pounds sulphur, twenty-five pounds scraps of cloth covered with vulcanized rubber compound. This compound, after being suitably ground and mixed in the customary manner, is vulcanized by exposure to a temperature of 205 to 270 degrees from one to four hours, or thereabouts. These proportions may, however, be variously modified, and form no part of my present invention. The sole may be made of various degrees of hardness by varying the proportions of the materials and the details of the vulcanizing process.

It is obvious that the sole and heel may be made of one piece; or they may be made in separate and distinct pieces; or either one of them may be made of india-rubber and the other of leather or of other material.

It will be also understood that instead of nails or pegs, rivets or other mechanical means may be used for holding the sole to the uppers without departure from my said invention.

I claim—

1. As a new article of manufacture, a sole for boots or shoes, made of vulcanized india-rubber or other vulcanized gum provided with holes for the reception of nails, pegs, rivets, threads, or other mechanical devices by means of which the sole may be attached to the uppers, such holes having a protecting external vulcanized surface, substantially as herein described.

2. Making india-rubber soles or soles of any other vulcanizable gum in molds, in combination with forming therein previous to vulcanization holes designed to contain nails, pegs, rivets, threads, or other mechanical means for the attachment of the sole to the uppers.

In testimony whereof I have signed this specification in presence of two witnesses.

CHARLES McBURNEY.

Witnesses:

EDWARD UPHAM,

ALFRED W. WORTHLEY.